(12) United States Patent
Hansen

(10) Patent No.: US 7,908,212 B2
(45) Date of Patent: Mar. 15, 2011

(54) TRANSACTION SETTLEMENT USING VALUE EXCHANGE SYSTEMS AND METHODS

(75) Inventor: Kurt Hansen, Parker, CO (US)

(73) Assignee: The Western Union Company, Englewood, CO (US)

( * ) Notice: Subject to any disclaimer, the term of this patent is extended or adjusted under 35 U.S.C. 154(b) by 1408 days.

(21) Appl. No.: 11/114,911

(22) Filed: Apr. 25, 2005

(65) Prior Publication Data

US 2006/0242059 A1    Oct. 26, 2006

(51) Int. Cl.
*G06Q 40/00* (2006.01)
(52) U.S. Cl. .......................... 705/39; 705/40
(58) Field of Classification Search ............ 705/39, 705/40
See application file for complete search history.

(56) References Cited

U.S. PATENT DOCUMENTS

| | | | |
|---|---|---|---|
| 5,878,141 A | 3/1999 | Daley et al. | |
| 6,092,053 A | 7/2000 | Boesch et al. | |
| 6,119,931 A | 9/2000 | Novogrod | |
| 6,324,525 B1 * | 11/2001 | Kramer et al. | 705/40 |
| 6,351,739 B1 | 2/2002 | Egendorf | |
| 6,370,514 B1 | 4/2002 | Messner | |
| 6,473,500 B1 * | 10/2002 | Risafi et al. | 379/144.01 |
| 6,594,640 B1 | 7/2003 | Postrel | |
| 6,738,901 B1 | 5/2004 | Boyles et al. | |
| 7,089,208 B1 * | 8/2006 | Levchin et al. | 705/39 |
| 7,130,817 B2 * | 10/2006 | Karas et al. | 705/26 |
| 7,165,052 B2 * | 1/2007 | Diveley et al. | 705/74 |
| 2001/0054003 A1 | 12/2001 | Chien et al. | |
| 2002/0046106 A1 | 4/2002 | Ishibashi et al. | |
| 2002/0062249 A1 * | 5/2002 | Iannacci | 705/14 |
| 2003/0055780 A1 | 3/2003 | Hansen et al. | |
| 2003/0140007 A1 * | 7/2003 | Kramer et al. | 705/40 |
| 2004/0102182 A1 * | 5/2004 | Reith et al. | 455/410 |
| 2005/0273402 A1 * | 12/2005 | Wallacher | 705/30 |

* cited by examiner

*Primary Examiner* — Lindsay M. Maguire
*Assistant Examiner* — Kambiz Abdi
(74) *Attorney, Agent, or Firm* — Kilpatrick Townsend & Stockton LLP

(57) ABSTRACT

A method of settling a purchase transaction includes establishing an account on behalf of a customer. The account relates to a quantity of service and establishing the account includes establishing an exchange ratio that equates the quantity of service to a measure of value. The method also includes thereafter receiving a transaction settlement request from a merchant for a purchase by the customer. The transaction settlement request has associated therewith an amount of value the customer has agreed to pay the merchant. The method also includes, in satisfaction of the transaction settlement request, decrementing the customer's quantity of service in accordance with the exchange ratio and the amount of value and providing the amount of value to the merchant.

20 Claims, 2 Drawing Sheets

TRANSACTION SETTLEMENT USING VALUE EXCHANGE SYSTEMS AND METHODS

CROSS-REFERENCES TO RELATED APPLICATIONS

This application is related to co-pending, commonly-assigned U.S. patent application Ser. No. 9/955,747, entitled "Methods and Systems for Transferring Stored Value," filed on Sep. 18, 2001, by Hansen, et al. the entirety of which is herein incorporated by reference for all purposes.

BACKGROUND OF THE INVENTION

Embodiments of the present invention relate generally to payment systems. More specifically, embodiments of the invention relate to systems and methods for funding transactions using value exchange.

Increasing numbers of consumers are shopping on line using computers, personal digital assistants (PDAs), cell phones, and the like. Similarly, the variety and numbers of goods and services available on line is increasing substantially. The wide variety of items available coupled with the nature of the shopping experience provide numerous opportunities for improving the processes for paying for purchases on line.

For example, many items available for purchase electronically (e.g., ring tones, single play songs, etc.) have a very small price. In fact, many people believe that more items would become available if convenient systems were in place for consumers to pay in fractions of cents. Individual transactions, however, have generally fixed overhead costs that make these so called "micropayments" impractical.

For at least the foregoing reasons, systems and methods are needed that simplify transaction settlement, especially electronic transactions having values less than one cent.

BRIEF SUMMARY OF THE INVENTION

Embodiments of the invention thus provide a method of settling a purchase transaction. The method includes establishing an account on behalf of a customer. The account relates to a quantity of service and establishing the account includes establishing an exchange ratio that equates the quantity of service to a measure of value. The method also includes thereafter receiving a transaction settlement request from a merchant for a purchase by the customer. The transaction settlement request has associated therewith an amount of value the customer has agreed to pay the merchant. The method also includes, in satisfaction of the transaction settlement request, decrementing the customer's quantity of service in accordance with the exchange ratio and the amount of value and providing the amount of value to the merchant.

In some embodiments, providing the amount of value to the merchant includes aggregating a plurality of transaction settlement requests for a specific merchant and providing an amount of value to the specific merchant based on the aggregation. The account may relate to Internet access and the exchange ratio may equate a period of Internet access to an amount of money. The account may relate to telephone service and the exchange ratio may equate a period of access to an amount of money. The amount of value may be less than one cent. The quantity of service may be a first term having a first expiration date and time in which case decrementing the customer's quantity of service in accordance with the exchange ratio and the amount of value of the transaction may include advancing the first expiration date and time to a revised expiration date and time. The method may then include receiving payment from the customer for a subsequent term and establishing the beginning of the subsequent term as the revised expiration date and time. The payment from the customer may include an overhead portion and a service portion, in which case the method may include establishing the end of the subsequent term using only the service portion of the payment.

In still other embodiments, a system for settling a purchase transaction includes a processor and a storage arrangement. The systems also includes instructions that program the processor to store account information for a customer account at the storage arrangement. The account information includes information that defines a quantity of service for the customer and an exchange ratio that equates the quantity of service to a measure of value. The instructions also program the processor to receive a transaction settlement request from a merchant relating to the customer. The transaction settlement request has associated therewith an amount of value the customer has agreed to pay the merchant. The instructions also program the processor to decrement the customer's quantity of service in accordance with the exchange ratio and the amount of value and provide the amount of value to the merchant.

In some embodiments, the instructions, in programming the processor to provide the amount of value to the merchant, program the processor to aggregate a plurality of transaction settlement requests for a specific merchant and provide an amount of value to the specific merchant based on the aggregation. The account information may relate to Internet access and the exchange ratio may equate a period of Internet access to an amount of money. The account information may relate to telephone service and the exchange ratio may equate a period of access to an amount of money. The amount of value may be less than one cent. The quantity of service may be a first term having a first expiration date and time, in which case decrementing the customer's quantity of service in accordance with the exchange ratio and the amount of value may include advancing the first expiration date and time to a revised expiration date and time, in which case the software may program the processor to, upon receipt of payment from the customer for a subsequent term, establish the beginning of the subsequent term as the revised expiration date and time. The payment from the customer may include an overhead portion and a service portion in which case the software may program the processor to establish the end of the subsequent term using only the service portion of the payment.

In still other embodiments, a computer-readable medium has stored thereon instructions that program a processor to store account information for a customer account at the storage arrangement. The account information include information that defines a quantity of service for the customer and an exchange ratio that equates a measure of value to the customer's quantity of service. The instructions also program the processor to receive a transaction settlement request from a merchant relating to the customer. The transaction settlement request has associated therewith an amount of value the customer has agreed to pay the merchant. The instructions also program the processor to decrement the customer's quantity of service in accordance with the exchange ratio and the amount of value and provide the amount of value to the merchant.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

According to embodiments of the invention, a consumer establishes an account with a service provider. In some embodiments the consumer pays for a quantity of service from the service provider. The term of service may be segmented and each segment equated to a measure of value. In some embodiments, the service provider also may establish relationships, either directly or indirectly, with merchants and/or payment facilitators. The relationships may include pre-determined value exchange ratios that relate to the quantity of service. Thereafter, the consumer may purchase an item from a merchant and request that the payment for the purchase be settled against the consumer's account with the service provider. The service provider adjusts the consumer's quantity of service in relation to the value of the transaction with the merchant and sends payment to the merchant.

In a specific embodiment, the service provider is an Internet Service Provider (ISP) and the consumer's account relates to Internet access. For example, the consumer pays $20 per month for Internet access. The terms of the customer's service agreement allow the consumer to use the service term to pay for merchandise at the rate of $0.02 per hour of service. For example, if the consumer purchases a ring tone for $0.10 from a ring tone merchant, the ISP will pay the merchant $0.10 and decrement the consumer's account 5 hours.

Although the examples in the ensuing description will generally relate to an ISP as the service provider, those skilled in the art will appreciate that the present invention is not limited to ISPs, nor is the present invention limited to service providers specifically. Further, the present invention is not limited to purchases made via the Internet, nor is it limited to micropayments. Embodiments of the present invention may be used to purchase items of greater value made, for example, via a telephone sales unit.

Figure 1:
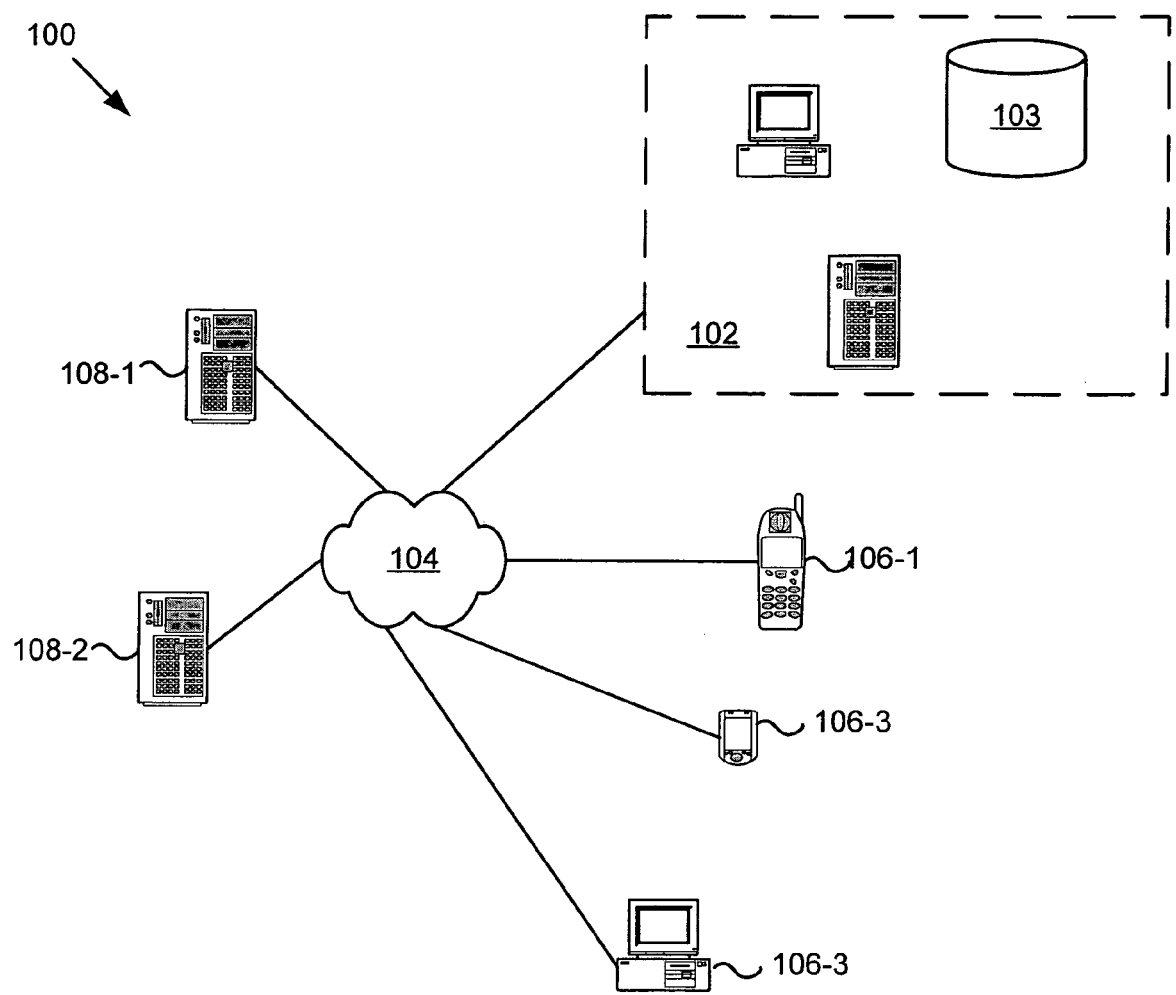
FIG. 1 illustrates an exemplary system according to embodiments of the invention.

Having described embodiments of the invention generally, attention is directed to FIG. 1, which illustrates an exemplary system 100 for settling transactions according to some embodiments. The system 100 of FIG. 1 is merely exemplary and should not be considered limiting. Those skilled in the art will realize equivalent systems in light of the disclosure herein.

The system 100 includes a host computer system 102 operated by a service provider. The host computer system 102 may include, for example, server computers, personal computers, workstations, web servers, and/or other suitable computing devices. The host computer system 102 includes application software that programs the host computer system 102 to perform one or more functions according to the present invention. For example, application software resident on the host computer system 102 may program the host computer system 102 to receive settlement requests and calculate value exchanges among customers and merchants. The host computer system 102 may include one or more of the aforementioned computing devices, as well as storage devices such as databases, disk drives, optical drives, and the like. The storage device may include solid state memory, such as RAM, ROM, PROM, and the like, magnetic memory, such as disc drives, tape storage, and the like, and/or optical memory, such as DVD. The host computer system 102 may be fully located within a single facility or distributed geographically, in which case a network may be used to integrate the host computer system 102. Many other examples are possible and apparent to those skilled in the art in light of this disclosure. In a specific embodiment, the host computer system 102 is operated by an Internet Service Provider (ISP).

The host computer system 102 may include a value exchange database 103. The value exchange database includes tables, records, and/or the like that equate different forms of value. For example, the value exchange database may include entries that equate Internet access minutes to dollars, cell phone minutes to airline miles, loyalty points with one merchant to loyalty points with a second merchant, and the like. Similar value exchange systems are more fully described in previously-incorporated U.S. patent application Ser. No. 9/955,747.

The host computer system 102 is connected to a network 104 through which customers may interact with the host computer system using, for example, a customer computing device 106. The network 104 may be the Internet, an intranet, a wide area network (WAN), a local area network (LAN), a telephone network, a virtual private network, any combination of the foregoing, or the like. The network 104 may include both wired and wireless connections, including optical links. A customer computing device 106 may be a cell phone, such as the personal computing device 106-1, a personal digital assistant (PDA), such as the personal computing device 106-2, a personal computer, such as the customer computing device 106-3, and/or the like.

The system 100 also includes a plurality of merchants 108. Merchants may have physical storefronts and/or virtual storefronts. A customer may place an order with a merchant using a customer computing device 106 or other means. For example, a customer may use a cell phone to purchase ring tones, a personal computer to order merchandise, a PDA to download songs or other content, and the like. In some embodiments, a customer may place a telephone call or send an email to a merchant that requests the goods and/or services the customer desires to order. In other words, it is not necessary for the customer to order items electronically. In still other embodiments, the customer purchases an item at the merchant's physical location.

As will be explained in more detail hereinafter, when a customer purchases an item or service from a merchant, the customer requests the merchant to settle the transaction to the customer's account at the service provider. The service provider equates the purchase price to the customer's pre-established service. The service provider decrements the customer's remaining quantity of service accordingly and sends payment to the merchant.

Figure 2:
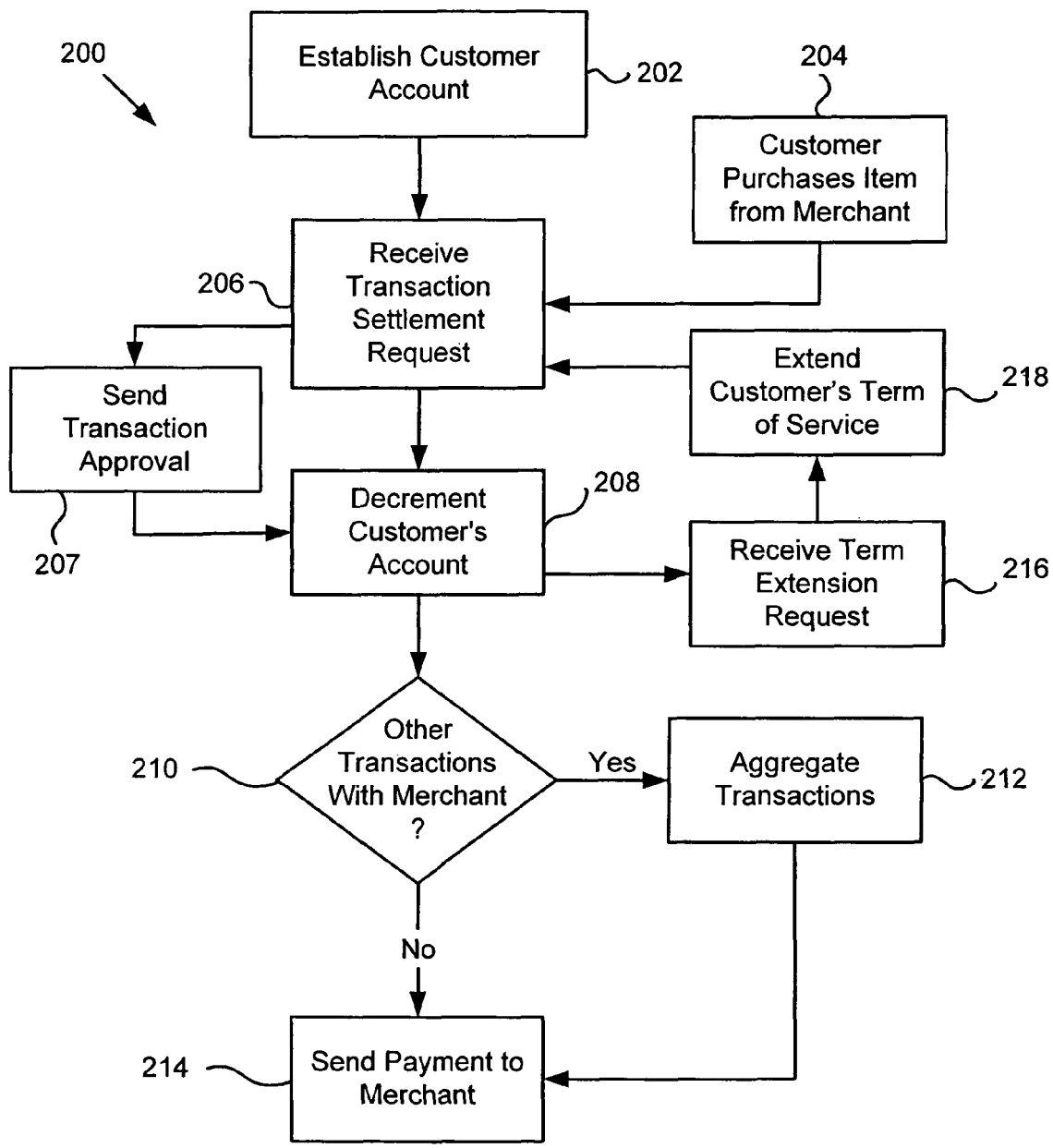
FIG. 2 illustrates an exemplary method according to embodiments of the invention, which method may be implemented in the system of FIG. 1.

Having described an exemplary system according to embodiments of the invention, attention is directed to FIG. 2, which illustrates an exemplary method 200 according to embodiments of the invention. The method 200 may be implemented in the system 100 of FIG. 1 or other suitable system. It should be noted that the method 200 is merely exemplary of a number of possible embodiments. Other embodiments may include more, fewer, or different steps than those illustrated and described here. Further, other methods according to the invention may traverse the blocks in orders other than that illustrated and described here.

The method begins at block 202 at which point a customer establishes an account with a service provider. As mentioned previously, the service provider may be, for example, an ISP, a wireless telephone service provider, and/or the like. In some embodiments, the service provider provides merchandise on a subscription basis. In other words, the customer may receive merchandise rather than mere services from the service provider. Ideally, however, the customer pre-pays for a term or quantity of service that may be easily segmented. For example, continuing with the example described previously, the service provider is an ISP and the customer purchases one month of Internet access for $20. According to the customer's service agreement, the customer's unused Internet access may be used to settle transactions with merchants at the rate of $15 per 30 days, $0.50 per day, $0.02 per hour, and 0.03 cents per minute. Thus, the customer may purchase items for fractions of cents.

In some embodiments, the customer's term of service may equate to other measures of value. For example, 1 day of service may equate to 5 minutes of wireless phone usage, 10 minutes of long distance, 3 airline mile points, 100 loyalty points with a particular merchant, and/or the like. All such information is stored at the service provider's value exchange database, such as the database 103 of FIG. 1.

At block 204, the customer purchases an item from a merchant. In some embodiments, the merchant has a pre-established relationship with the service provider, the terms of which include value exchange. In other embodiments, the relationship does not exist at the time the customer makes the purchase. The customer is, nevertheless, able to settle the transaction with the merchant using the service provider by way of a presentation instrument or the like that identifies an account of the customer at the service provider. In some embodiments, the customer merely provides an account number to the merchant.

The purchase may be completed using any conceivable process, including, for example, on line purchase, walk-in purchase, call-in purchase, and/or the like. In completing the transaction, the customer requests that the merchant settle the transaction against the customer's account at the service provider.

In an exemplary embodiment, the customer purchases a single play song from an online merchant. The customer uses a traditional website shopping experience to purchase the song, which will be played through the customer's computer. The merchant values the single playing of the song at 0.69 cents, about two-thirds of a penny. The merchant provides the customer with a selection option on the web page to settle the transaction with the customer's ISP. Thus, the customer is able to purchase the single playing of the song by simply clicking a button on a web page.

At block 206, the merchant sends a transaction settlement request to the service provider. The transaction settlement request may be sent electronically, physically, telephonically, or by other means. In some embodiments, the transaction settlement request is sent in real time and the merchant waits for a response before releasing the merchandise. In such embodiments, at block 207, the service provider verifies that the customer has a sufficient balance and sends an approval to the merchant.

Continuing with the example relating to a customer downloading a single play song, at block 208, the service provider decrements the customer's account in relation to the 0.69 cents. This comprises using the exchange ration to determine that the 0.69 cents is equal to 23 minutes of Internet access in this specific example. Hence, the customer's remaining term of Internet access is shortened by 23 minutes.

At block 210, the service provider determines whether payment on the present transaction may be combined with other transactions involving the same merchant, thereby creating a more efficient payment transaction. Transactions may be aggregated over any time period the parties agree to. If there are other transactions with the same merchant, then the transactions are aggregated at block 212. In either case, the service provider sends payment to the merchant at block 214.

At any time following account establishment, the customer may extend his quantity of service with the service provider. Many options for doing so exist, one of which is illustrated in the method 200 of FIG. 2. In this exemplary embodiment, the customer extends his term of service after at least one transaction in which the customer's initial term of service was shortened, i.e., the customer's term of service was shortened by 23 minutes at block 208. Hence, at block 216, the service provider receives the customer's request to extend his service term. In some embodiments, the request is prompted by an email sent by the service provider when the customer's remaining service term drops below a pre-established threshold (e.g., 10 days, two weeks, etc.). In some embodiments, the customer has preauthorized the service provider to charge the customer's credit card, debit his checking account, or the like, when the customer's account reaches a pre-established threshold. Other possibilities are apparent to those skilled in the art in light of this disclosure.

At block 218, the service provider extends the customer's service term. As discussed previously, the customer's service term may have been reduced through the purchase of other services or merchandise and may have no particular relevance to the date on which the term started. The original term may have been for one month starting on the 1st of the month. However, the original term may now expire on the 20th of the month. The customer may extend the term for another month from the term expiration, for a month plus the portion of the term used to settle purchase transaction, or for any term the customer desires, in some embodiments.

In some embodiments, the service provider may deduct an overhead payment in each term extension (e.g., $5 regardless of the length of the extension). Thus, if the customer pays $20 for an additional month of service, $5 may be overhead, while the remaining $15 would pay for the service at the rate of $0.50 per day. If the customer pays $65 for the term extension, $5 would go to overhead, and the remaining $60 would pay for four months of service. In still other embodiments, the service provider charges a flat rate overhead for each service term. Many such possibilities exist.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to "term of service" accounts as the settlement source. For example, embodiments of the invention may relate to other types of accounts, such as cell phone accounts and the like, to which transactions may be settled. Accordingly, the above description should not be taken as limiting the scope of the invention, which is defined in the following claims.

What is claimed is:

1. A system for settling a purchase transaction, comprising:
a processor;
a storage arrangement; and
instructions that program the processor to:
store account information for a customer account at the storage arrangement, wherein the account information includes information that defines a quantity of service for the customer and an exchange ratio that equates the quantity of service to a measure of value;
receive a transaction settlement request from a merchant relating to the customer, wherein the transaction settlement request has associated therewith an amount of value the customer has agreed to pay the merchant;
decrement the customer's quantity of service in accordance with the exchange ratio and the amount of value; and
provide the amount of value to the merchant;
wherein the instructions, in programming the processor to provide the amount of value to the merchant, program the processor to aggregate a plurality of transaction settlement requests for a specific merchant and provide an amount of value to the specific merchant based on the aggregation.

2. The system of claim 1, wherein the account information relates to Internet access and the exchange ratio equates a period of Internet access to an amount of money.

3. The system of claim 1, wherein the account information relates to telephone service and the exchange ratio equates a period of access to an amount of money.

4. The system of claim 1, wherein the amount of value is less than one cent.

5. The system of claim 1, wherein the quantity of service comprises a first term having a first expiration date and time, wherein decrementing the customer's quantity of service in accordance with the exchange ratio and the amount of value comprises advancing the first expiration date and time to a revised expiration date and time, and wherein the software further programs the processor to, upon receipt of payment from the customer for a subsequent term, establish the beginning of the subsequent term as the revised expiration date and time.

6. The system of claim 5, wherein the payment from the customer includes an overhead portion and a service portion, and wherein the software further programs the processor to establish the end of the subsequent term using only the service portion of the payment.

7. A computer-readable medium having stored thereon instructions that program a processor to:
store account information for a customer account at the storage arrangement, wherein the account information includes information that defines a quantity of service for the customer and an exchange ratio that equates a measure of value to the customer's quantity of service;
receive a transaction settlement request from a merchant relating to the customer, wherein the transaction settlement request has associated therewith an amount of value the customer has agreed to pay the merchant;
decrement the customer's quantity of service in accordance with the exchange ratio and the amount of value;
provide the amount of value to the merchant; and
provide the amount of value to the merchant, program the processor to aggregate a plurality of transaction settlement requests for a specific merchant and provide an amount of value to the specific merchant based on the aggregation.

8. The non-transitory computer-readable medium of claim 7, wherein the instructions, in programming the processor to provide the amount of value to the merchant, program the processor to aggregate a plurality of transaction settlement requests for a specific merchant and provide an amount of value to the specific merchant based on the aggregation.

9. The non-transitory computer-readable medium of claim 7, wherein the account information relates to Internet access and the exchange ratio equates a period of Internet access to an amount of money.

10. The non-transitory computer-readable medium of claim 7, wherein the account information relates to telephone service and the exchange ratio equates a period of access to an amount of money.

11. The non-transitory computer-readable medium of claim 7, wherein the amount of value is less than one cent.

12. The non-transitory computer-readable medium of claim 7, wherein the quantity of service comprises a first term having a first expiration date and time, wherein decrementing the customer's quantity of service in accordance with the exchange ratio and the amount of value of the transaction comprises advancing the first expiration date and time to a revised expiration date and time, and wherein the software further programs the processor to, upon receipt of payment from the customer for a subsequent term, establish the beginning of the subsequent term as the revised expiration date and time.

13. The non-transitory computer-readable medium of claim 12, wherein the payment from the customer includes an overhead portion and a service portion, and wherein the software further programs the processor to establish the end of the subsequent term using only the service portion of the payment.

14. A method for settling a purchase transaction, the method comprising:
storing, at a host computer system, account information for a customer account at the storage arrangement, wherein the account information includes information that defines a quantity of service for the customer and an exchange ratio that equates a measure of value to the customer's quantity of service;
receiving, by the host computer system, a transaction settlement request from a merchant relating to the customer, wherein the transaction settlement request has associated therewith an amount of value the customer has agreed to pay the merchant;
decrementing, by the host computer system, the customer's quantity of service in accordance with the exchange ratio and the amount of value;
providing, by the host computer system, the amount of value to the merchant; and
providing, by the host computer system, the amount of value to the merchant, program the processor to aggregate a plurality of transaction settlement requests for a specific merchant and provide an amount of value to the specific merchant based on the aggregation.

15. The method of claim 14, further comprising:
aggregating a plurality of transaction settlement requests for a specific merchant; and
providing an amount of value to the specific merchant based on the aggregation.

16. The method of claim 14, wherein the account information relates to Internet access and the exchange ratio equates a period of Internet access to an amount of money.

17. The method of claim 14, wherein the account information relates to telephone service and the exchange ratio equates a period of access to an amount of money.

18. The method of claim 14, wherein the amount of value is less than one cent.

19. The method of claim 14, wherein the quantity of service comprises a first term having a first expiration date and time, wherein decrementing the customer's quantity of service in accordance with the exchange ratio and the amount of value of the transaction comprises advancing the first expiration date and time to a revised expiration date and time, and wherein upon receipt of payment from the customer for a subsequent term, the method further comprises establishing the beginning of the subsequent term as the revised expiration date and time.

20. The method of claim 19, wherein the payment from the customer includes an overhead portion and a service portion, and wherein the method further comprises establishing the end of the subsequent term using only the service portion of the payment.

* * * * *

UNITED STATES PATENT AND TRADEMARK OFFICE
CERTIFICATE OF CORRECTION

PATENT NO.         : 7,908,212 B2                                   Page 1 of 1
APPLICATION NO.    : 11/114911
DATED              : March 15, 2011
INVENTOR(S)        : Kurt Hansen It is certified that error appears in the above-identified patent and that said Letters Patent is hereby corrected as shown below:

In the Specification

Column 1, line 10, please delete "9/955,747" and insert --09/955,747--.

Column 4, line 23, please delete "9/955,747" and insert --09/955,747--.

Signed and Sealed this
Thirty-first Day of May, 2011

David J. Kappos
*Director of the United States Patent and Trademark Office*